Figure 1:
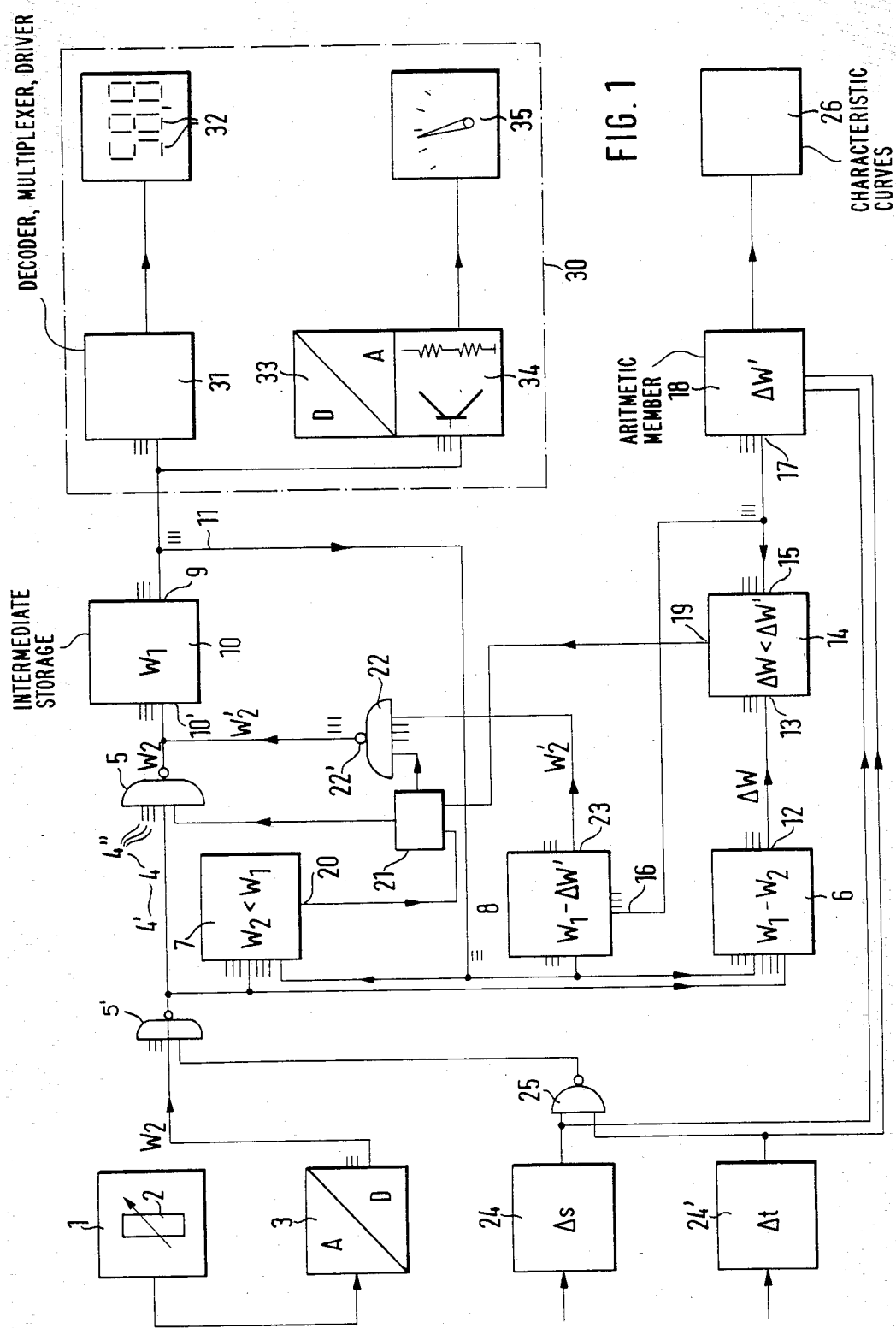

United States Patent [19]

Grohmann et al.

[11] Patent Number: 4,502,124
[45] Date of Patent: Feb. 26, 1985

[54] PROCESS FOR DETERMINATION OF THE STORED QUANTITY OF OPERATING FLUIDS FOR AUTOMOTIVE VEHICLES, AND CIRCUIT FOR CONDUCTING THE PROCESS

[75] Inventors: Kurt Grohmann; Walter Weishaupt, both of Munich, Fed. Rep. of Germany

[73] Assignee: Bayerische Motoren Werke AG, Fed. Rep. of Germany

[21] Appl. No.: 169,793

[22] Filed: Jul. 17, 1980

[30] Foreign Application Priority Data

Jul. 17, 1979 [DE] Fed. Rep. of Germany ....... 2928767

[51] Int. Cl.³ ............................................. G06F 15/48
[52] U.S. Cl. ...................... 364/442; 73/113; 364/424; 364/509
[58] Field of Search ............... 364/509, 510, 442, 424; 340/52 R, 59, 603, 612; 73/290 R, 113; 180/282–284; 116/28 R, 227

[56] References Cited

U.S. PATENT DOCUMENTS

| Re. 15,651 | 7/1923 | Stuber | 364/442 |
| 3,618,400 | 11/1971 | Hull | 116/227 |
| 3,925,756 | 12/1975 | Edwards | 340/59 |
| 3,939,470 | 2/1976 | Arai et al. | 340/59 |
| 3,964,037 | 6/1976 | Lamphere | 340/603 |
| 4,023,137 | 5/1977 | Olsbo et al. | 340/59 |
| 4,046,998 | 9/1977 | Kuno et al. | 364/442 |
| 4,113,046 | 9/1978 | Arpino | 364/442 |
| 4,157,030 | 6/1979 | Keely | 73/113 |
| 4,174,626 | 11/1979 | Agawa | 73/113 |
| 4,218,744 | 8/1980 | Pratt et al. | 364/442 |

Primary Examiner—Errol A. Krass
Attorney, Agent, or Firm—Craig & Burns

[57] ABSTRACT

A sensor measures vehicle operating fluid volume, generating a signal which is transmitted to a data processing system. The data processing system actuates an indicator to show a volume indication corrected for vehicle acceleration. Correction may be effected in accordance with vehicle operating parameters.

24 Claims, 2 Drawing Figures

PROCESS FOR DETERMINATION OF THE STORED QUANTITY OF OPERATING FLUIDS FOR AUTOMOTIVE VEHICLES, AND CIRCUIT FOR CONDUCTING THE PROCESS

The present invention relates to a process for determining the stored quantity of operating fluids for automotive vehicles wherein the measuring signal of a quantity pickup is fed to an indicator. The operating fluid is, for example, fuel or motor oil.

In the conventional processes of this type, the quantity pickup, constructed, for example, as a dip-tube pickup, is constantly connected directly or via attenuating members to the digital or analog indicator. In either case, however, the thus-reproduced value of the stored quantity will fluctuate around the actual value, especially in case of a long-term acceleration of the automotive vehicle. Such a constantly changing value is troublesome, particularly in case of a digital indicator.

The invention provides a process of the type mentioned hereinabove wherein, with low expenditure, an acceleration-dependent fluctuation of the indicated value is avoided.

The invention solves this problem by providing that the measuring signal is first introduced into a storage unit, the output of which is connected to the indicator, and that the connection between the measuring pickup and the storage unit is interrupted in case of an acceleration-dependent change in the liquid level.

The connection between the quantity pickup and the storage unit is interrupted in case of a linear or radial acceleration of the automotive vehicle. The indicator will show a constant value contained in the storage unit during the acceleration period and optionally after termination thereof for a brief settling or smoothing period. Only thereafter is the indication of the actual output signal of the quantity pickup resumed, which signal may be reduced as compared to the indicated value. In this way, an apparent increase or an excessive decrease of the indicated value, merely due to acceleration, is avoided.

An advantageous embodiment of the process resides in determining the measuring signal in temporally or distance-dependent, identical intervals and comparing same with the preceding measuring signal, and by transmitting to the storage unit a standardized or normalized measuring signal instead of the actual measuring signal, if the actual measuring signal lies above an upper limit value or below a lower limit value. This ensures that the indicated value, even with a uniform movement of the automotive vehicle, cannot change constantly, but only at predetermined intervals and, in turn, only along the lines of a decrease.

A simple determination of the standardized measuring signal is made possible by making the same equal to the upper or to the lower limit value, if the actual measuring signal is larger than the upper limit value or smaller than the lower limit value.

A further simplification of the process resides in making the upper limit value equal to the preceding measuring signal.

In a corresponding way, the lower limit value can be equal to the difference obtained from the preceding measuring signal and a standard consumption based on the distance traversed. By this establishment of the limit values, the object is attained that the indicated value for the stored quantity corresponds relatively accurately to the actual value, even when the quantity pickup is cut off in dependence on the acceleration by interrupting its connection to the storage unit. Furthermore, a smooth indication is obtained even when starting the automotive vehicle from an inclined position of the latter. In this case, the first measuring signal governing for the process differs from the measuring signal corresponding to the actually stored quantity. If it is larger or smaller than such signal, i.e., if the indication shows "too much" or "too little," then the further measuring signals delivered by the quantity pickup will range for a certain period of time above the upper limit value or below the lower limit value. By replacing the actual output signal by the standardized output signal, the indicated value will gradually approach the actual value.

The aforementioned standard consumption can be determined to be equal to a maximum consumption—in this case the approach of the indicated value toward the actual value of the stored quantity will take place relatively quickly—or with the aid of a field of characteristic curves, by storing the consumption values in dependence on driving and operating parameters, such as speed and engine temperature. The indicated decrease in the registered value then corresponds very accurately to the actual conditions even when the quantity pickup is turned off.

A switch is arranged, which is open in dependence on the acceleration, between the quantity pickup and the storage unit in one circuit for conducting the process. The switch can be constructed, for example, in the form of a pendulum, in such a way that it connects the quantity pickup to the storage unit only in a no-acceleration condition. Alternatively, the switch can also be operated on the basis of the abnormal and acceleration-caused change of the measuring signal determined from a comparison of the actual measuring signal with the preceding measuring signal.

One embodiment of the circuit resides in connecting an analog-to-digital converter after the measuring pickup, the output of this converter being connected together with the output of the storage unit, to a first comparator and to a subtraction member; connecting the output of the subtraction member and the output of an arithmetic member to a second comparator for determining the standard consumption; and providing that the comparators control the switch.

The switch, in this connection, can be a logic link which is connected to the comparators via further logic links.

In accordance with the foregoing, an object of the invention is to provide improved method and apparatus for determination of a stored quantity of operating fluids for automotive vehicles.

Another object of the invention is to provide storage for an initial measured signal, interruption of the measurement process being effected during acceleration dependent changes in vehicle operation, an indication being provided of the stored initial measured signal.

Another object of the invention is to provide an indication of a stored measured signal for operating fluids during linear and radial acceleration of the vehicle.

Another object of the invention is to provide an indication representing a quantity of operating fluids for a vehicle determined from measured signals and from a standard value for measured signals which is dependent upon vehicle operating parameters.

Another object of the invention is to provide indications of a stored quantity of operating fluids for a vehicle wherein a standardized measuring signal is employed in cooperation with upper and/or lower limits to produce an indication of increased accuracy as to the stored quantity of operating fluids.

Figure 2:
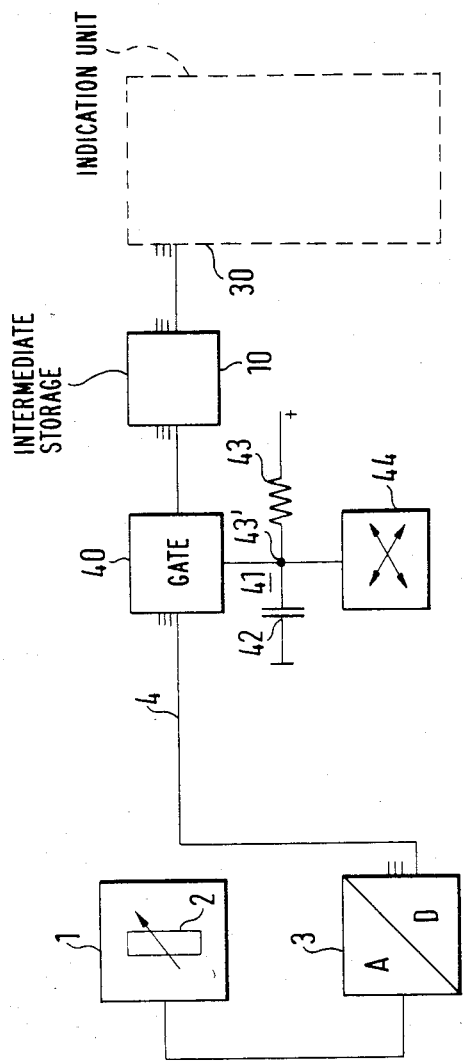

These and other objects, features and advantages of the present invention will become more apparent from the following description when taken in connection with the accompanying drawings, which show, for the purpose of illustration only, one embodiment in accordance with the present invention, and wherein:

FIGS. 1 and 2 show circuits making it possible to indicate the fuel reservoir of automotive vehicles without indication fluctuations.

A quantity pickup 2, for example, in the shape of a dip-tube pickup, is arranged in a fuel storage tank 1 for an automotive vehicle, which tank is shown schematically in FIG. 1. The analog measuring signal of the quantity pickup 2 is fed via an analog-to-digital converter 3 as a digital measuring signal by means of a data bus 4 to NAND-gates 5 and 5' a subtraction member 6, and a first comparator 7. The data bus 4 consists, just as additional data buses described below and/or illustrated in the drawing, of several parallel lines, one line 4' of which is drawn in its entirety, and the other lines 4'' being merely indicated.

The subtraction member 6 is furthermore connected, just as the comparator 7 and another subtraction member 8, to the signal output 9 of an intermediate storage unit 10 via a data bus 11. The signal output 10' of the intermediate storage unit 10 is connected to the signal output of the NAND-gate 5. The signal output 12 of the subtraction member 6 is connected to the signal input 13 of a second comparator 14 and the other signal input 15, along with the second signal input 16 of the subtraction member 8, is connected to the signal output 17 of an arithmetic member 18.

The control outputs 19 and 20 of the comparators 14 and 7 are connected together to a gate circuit 21, by means of which the NAND-gate 22 and additionally a NAND-gate 5 are activated. NAND-gate 22 is connected to receive input from the signal output 23 of the subtraction member 8. The signal output 22' of the NAND-gate 22 is connected to the signal input 10' of the intermediate storage unit 10.

The arithmetic member 18 is connected to an integrating member 24, which latter receives pulses from 27 corresponding to the traversed distance. These pulses are formed, for example, by a wheel rotation sensor in conjunction with a pulse shaper connected thereafter. A corresponding integrating member 24', to which are fed pulses from 28 in correspondence with the elapse driving time, is likewise connected to the arithmetic member 18. The output signal of the integrating member 24 is furthermore connected via a NAND-gate 25 to the NAND-gate 5'. The arithmetic member 18 determines the so-called standard consumption $\Delta W'$ from the driving speed, i.e., the quotient of the distance traversed in a specific driving time, based on a stored, maximum consumption or on consumption values contained in an indicated field of characteristic curves 26. Characteristic curves 26 represent stored values of data for fuel consumption $W_3$ dependent upon driving and operating parameters such as speed V and engine temperature T. Data relating $W_3$, V and T may, for example, be stored in read only memory (ROM) or the like. Arithmetic unit 18 performs the determination of $\Delta W'$ in accordance with the relationships reflected in the data from 26. It will be appreciated that the particular relationships of $W_3$, V and T are algebraically related according to principles well known in the art and arithmetic device 18 implements mathematically those relationships employing the sensed and stored signals. For the foregoing purposes, arithmetic unit 18 may include storage registers into which initial and calculated values may be inserted. In addition, values input by conventional I/O devices such as keyboards, record controlled input devices and the like also provide input to arithmetic unit 18 for insertion, for example, of maximum and minimum values and data such as that from characteristic curves 26. As its name suggests, arithmetic unit 18 includes logic circuitry for performing four-function arithmetic operations and sequences thereof under control, either of stored instruction sequences or by input instructions using the I/O devices previously described, in order to calculate $\Delta W'$.

The digital measuring signals of the analog-to-digital converter 3 corresponding to the amount of fuel present are transmitted, in clock-pulse form produced by the integrating member 24, in distance-dependent, identical intervals as the actual measuring signals $W_2$ to the comparator 7 and to the subtraction member 6. These latter units compare the actual measuring signal with the preceding measuring signal $W_1$ stored in the intermediate storage unit 10 and/or form the difference $\Delta W$ of the two signals. The difference signal $\Delta W = W_1 - W_2$ obtained in the subtraction member 6 is compared in the comparator 14 with the standard consumption $\Delta W'$ determined in the arithmetic member 18.

If the actual measuring signal $W_2$ is smaller than the preceding measuring signal $W_1$ and larger than the difference $W_2'$ from the preceding measuring signal $W_1$ and the standard consumption $\Delta W'$, then the gate circuit 21 blocks the NAND-gate 22 and activates the NAND-gate 5. The latter acts as a switch and frees the actual measuring signal $W_2$ so that this signal is stored in the intermediate storage unit 10 instead of the preceding measuring signal $W_1$ and is transmitted to an indicating means 30.

The indicating means 30 consists conventionally of a unit 31 made up of a decoder, a multiplexer, and a driver with liquid-crystal or segment indicating elements 32 connected thereafter for the digital representation of the fuel reservoir and/or it consists of a digital-to-analog converter 33 and resistance wire 34 with a pointer instrument 35 for an analog representation of the fuel reservoir.

If the actual measuring signal $W_2$ is larger than the preceding measuring signal $W_1$, due to an acceleration of the automotive vehicle or due to an incorrect indication of the first measuring signal after startup of the vehicle, which is possible when the vehicle is in an inclined position, then the comparator 14 is the only unit activating the gate circuit 21. Thereby the NAND-gate 5 and furthermore the NAND-gate 22 are blocked. The preceding measuring signal $W_1$ remains preserved in the intermediate storage unit 10. The indication 30 is not changed.

In contrast thereto, if the actual measuring signal $W_2$ is smaller than the difference from the preceding measuring signal $W_1$ and the standard consumption $\Delta W'$, then only the comparator 7 activates the gate circuit 21. Thereby the NAND-gate 5 is blocked, but the NAND-gate 22 is opened. Via the latter, the difference value determined in the subtraction member 8 and derived from the preceding measuring signal $W_1$ and the standard consumption ΔW' passes into the intermediate storage unit 10 and is represented in the indicator 30.

Thus, a change of the indication 30 is possible merely in certain distance and/or time intervals—for this purpose, only the output of the integrating member 24 is transmitted to the NAND-gate 25—up to a predetermined, maximum value (=standard consumption). Thereby a fluctuation of the indication, i.e., a temporary increase or an excessive decrease of the indicated reservoir value is excluded, and a smooth and uniform indication is attained. The indication is changed only along the lines of a reduction in fuel reservoir. Instead of a dip-tube pickup, it is also possible to use, for example, a lever pickup, which is substantially more economical.

In FIG. 2, wherein identical parts carry the same reference numerals as set forth in FIG. 1, the output signal of the analog-to-digital converter 3 is fed to the intermediate storage unit 10 via a gate circuit 40. The gate circuit 40 is controlled by an RC-member 41 consisting of the capacitor 42 and the resistor 43 and being connected, on the one hand, to ground and, on the other hand, to the vehicle battery (+).

The central tap 43' of the RC-member 41 is connected to an acceleration pickup 44 in the form of a mercury of pendulum switch which discharges the capacitor 42 upon each acceleration of the automotive vehicle. Due to the ground potential which is then present at the central tap 43', the gate circuit 40 is blocked and thereby the connection between the analog-to-digital converter 3 and the intermediate storage unit 10 is interrupted. The digital measuring signal for the fuel reservoir then can no longer pass on to the indication unit 30. Rather, the latter indicates the fuel reservoir prior to onset of the acceleration.

At the end of the acceleration, a recharging of the capacitor 42 takes place via the resistor 43. At a predetermined charging condition of the capacitor 42, the gate circuit 40 is deactivated so that then the digital measuring signal for the fuel reservoir can again pass to the intermediate storage unit 10 and into the indicating unit 30. The rest period after the end of the acceleration is dimensioned so that the level of the fuel tank 1, which is normally in motion during an acceleration, has settled down again, and thus the measuring signal of the quantity pickup 2 corresponds to the actual stored quantity.

Instead of determining the acceleration of the automotive vehicle by an arithmetic process, as done in the circuit of FIG. 1, this acceleration is directly determined in the circuit of FIG. 2 and utilized for smoothing out the indicating unit 30.

While we have shown and described an embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A process for the determination of the stored quantity of operating fluids for automotive vehicles, wherein a measuring signal of a quantity of operating fluids is indicated, characterized in
   storing the measuring signal,
   transmitting said stored signal for indication,
   interrupting the storing of the measuring signal upon an acceleration-dependent change in the liquid level,
   determining the measuring signal in temporally or distance-dependent, identical intervals,
   comparing a determined measuring signal with a preceding determined measuring signal and
   storing a standardized measuring signal instead of the measuring signal if the measuring signal lies above an upper limit value or below a lower limit value.

2. A process according to claim 1, characterized in that the standardized measuring signal is equal to the upper limit value or to the lower limit value, if the measuring signal is larger than the upper limit value or smaller than the lower limit value, respectively.

3. A process according to claim 1 or 2, characterized in that the upper limit value is equal to the preceding determined measuring signal.

4. A process according to claim 2, characterized in that the lower limit value is equal to the difference between the preceding determined measuring signal and a standard consumption based on a traversed distance.

5. A process according to claim 4, characterized in that the standard consumption is equal to a maximum consumption.

6. A process according to claim 4, characterized in
   determining the standard consumption in accordance with a field of characteristic curves for which consumption values are stored in dependence on driving and operating parameters, such as speed and engine temperature.

7. Apparatus for the determination of a stored quantity of operating fluids comprising
   a measuring means,
   an analog-to-digital converter connected to the measuring means,
   a storage means to receive the output of the converter,
   a first comparator means to receive an output from said converter and said storage unit
   a subtraction means to receive an output from said converter and said storage unit,
   arithmetic means to determine a standard consumption, and
   a second comparator means to receive the output of the subtractor and the arithmetic means for producing an output,
   a switch,
   means for controlling said switch in response to output from said comparators.

8. Apparatus for the determination according to claim 7, characterized by a means for switching arranged between the measuring means and the storage unit and being open in dependence on acceleration under control of said first and second comparator means.

9. Apparatus for the determination according to claim 7, characterized in that the switch is a logic link (NAND-gate), which is connected to the comparators via further logic links (NAND-gates).

10. Apparatus for the determination according to claim 9
    comprising a gate circuit controlled by an acceleration pickup.

11. Apparatus for the determination according to claim 10, characterized in that there is provided
    an RC-means with center tap means the center tap means of the RC-means being connected into the connection between the gate circuit and the acceleration pickup, the capacitor of the RC-means being continuously charged.

12. In a method for indicating a stored quantity of operating fluid for a vehicle having a fuel container, the steps of
sequentially sensing the level of fluid in said container to produce first signals representative of fluid level,
storing second signals representing said fluid level in response to said first signals,
displaying indications of quantity of operating fluid dependent upon said second signals,
determining the difference between at least two of said second signals, and
controlling the displaying of indications of quantity of operating fluid in response to said determining step.

13. The method of claim 12, wherein said storing step comprises the additional step of
responding to time and distant-dependent signals to store said second signals only at discrete time intervals.

14. The method of claim 13, comprising the additional steps of
storing at least one limit value for said second signals, and
continuing to display the most recently displayed value of fluid quantity if the value of the most recently stored second signal equals said limit value.

15. The method of claim 13, comprising the additional steps of
storing at least one limit value for said second signals, and
continuing to display the most recently displayed value of fluid quantity if the value of the most recently stored second signal crosses said limit value.

16. The method of claim 13, comprising the additional steps of
determining for said second signal a standard value dependent upon vehicle operating parameters, and
controlling the displaying of indications of quantity of operating fluid in accordance with said determined standard value second signal.

17. The method of claim 12, comprising the additional step of
modifying said controlling step in accordance with the acceleration of said vehicle.

18. In apparatus for indicating a stored quantity of operating fluid for a vehicle having a fuel container,
means for sequentially sensing the level of fluid in said container to produce first signals representative of fluid level,
means for storing second signals representing said fluid level in response to said first signals,
means for displaying indications of quantity of operating fluid dependent upon said second signals,
means for determining the difference between at least two of said second signals, and
means for controlling the displaying of indications of quantity of operating fluid in response to said means for determining the difference.

19. The apparatus of claim 18, further comprising
means responding to time and distance-dependent signals to store said second signals only at discrete time intervals.

20. The apparatus of claim 19, further comprising
means for storing at least one limit value for said second signals, and
means for continuing to display the most recently displayed value of fluid quantity if the value of the most recently stored second signals equals said limit value.

21. The apparatus of claim 19, further comprising
means for storing at least one limit value for said second signals, and
means for continuing to display the most recently displayed value of fluid quantity if the value of the most recently stored second signals crosses said limit value.

22. The apparatus of claim 19, further comprising
means for determining for said second signal a standard value dependent upon vehicle operating parameters, and
means for controlling the displaying of indications of quantity of operating fluid in accordance with said determined standard value second signal.

23. The apparatus of claim 18, further comprising
means for modifying said control means in accordance with the acceleration of said vehicle.

24. The apparatus of claim 23, further comprising
an RC means with center tap,
an acceleration pickup measuring means connected to said RC means, and
means connected to said central tap for controlling the storage operation of said storage means in accordance with acceleration.

* * * * *